United States Patent [19]
Hennig

[11] Patent Number: 5,956,455
[45] Date of Patent: Sep. 21, 1999

[54] FAULT TOLERANT VCR RECORDING CONTROL

[75] Inventor: Bruno Emanuel Hennig, Zurich, Switzerland

[73] Assignee: RCA Thomson Licensing Corporation, Princeton, N.J.

[21] Appl. No.: 08/385,393

[22] Filed: Feb. 7, 1995

Related U.S. Application Data

[63] Continuation of application No. 08/261,083, Jun. 16, 1994, abandoned, which is a continuation of application No. 07/778,319, Oct. 21, 1991, abandoned.

[30] Foreign Application Priority Data

Dec. 20, 1990 [CH] Switzerland ............................ 9027669

[51] Int. Cl.$^6$ .................................................. H04N 5/76
[52] U.S. Cl. ............................................. 386/83; 348/906
[58] Field of Search ....................... 386/83, 46; 348/906, 348/731–732, 734, 474; 360/27, 69; H04N 5/76, 9/79

[56] References Cited

U.S. PATENT DOCUMENTS 4,706,121 11/1987 Young ...................................... 358/146
4,879,611 11/1989 Fukui et al. ............................ 360/33.1
4,894,714 1/1990 Christis ..................................... 358/86
4,908,707 3/1990 Kinghorn .................................. 360/27

FOREIGN PATENT DOCUMENTS 0256152 2/1988 European Pat. Off. .
0386467 9/1990 European Pat. Off. .
0393556 10/1990 European Pat. Off. .
2126002 3/1984 United Kingdom .

OTHER PUBLICATIONS

Rundfunktechnische Mitteilungen, vol. 30, No. 1, Jan. 1986, pp. 1–8 (translation attached ).

*Primary Examiner*—Thai Tran
*Attorney, Agent, or Firm*—Joseph S. Tripoli; Peter M. Emanuel; Thomas F. Lenihan

[57] ABSTRACT

A Videocassette Recorder including VPS (Video Program System) and VPT (VCR Programmed by Teletext) automatic programming capability continuously compares preprogrammed VPS data to incoming VPS time codes for the currently running program, and to VPS program schedule information. In this way, the VPS and VPT controller in the VCR can detect errors in the original schedule pages from which it was programmed, and correct for those errors in its own record programming memory. Moreover, circuitry according to the subject invention can detect an error in the VPS code of a currently-running television show, correct for the error, and properly record the show.

6 Claims, 11 Drawing Sheets

```
P303    303    ARD/ZDF FR    3.08.90  13:31:25
                                              FREITAG
ZDF                                      3. AUGUST 1990
                                         1D102 030890 16
19.00   1900   HEUTE
19.20   1920   ZDF SPEZIAL
               DIE SCHNELLE WAHL
20.00   2000   EUROCORPS...............................314
               VT-UNTERTITEL............................150
20.50   2050   DIE PYRAMIDE
21.45   2145   HEUTE-JOURNAL
22.15   2215   ASPEKTE
22.50   2250   DIE-SPORT REPORTAGE
23.15   2315   SHOGUN
        0408090   FERNSEHFILM (G).......................318
00.15   0015   POKER MIT VIER DAMEN
               SPIELFILM, USA 1955
01.35   0135   HEUTE BIS 01.40UHR
```

CONCEALD VPS DATA:
- 1900 VPS TIME
- 1D102 PROGR. SOURCE
- 030890 VPS DATE

FIG. 2
PRIOR ART

```
RCA VCR CONTROLLER

RECORD PROGRAMMING 20.00-20.50       EUROCOP
0.300.   VPS 2000  ZDF         1D102 0308 2000

23.50-01.20       DES TEUFELS SAAT
0.300.   VPS 2350  ARD         1D101 0308 2350

21.50-23.10       MY NAME IS NOBODY
05.00.   VPS 2140  ORF1        1A101 0508 2140

REMAINING ENTRY SPACE
```

VPS CODE:
1D101 0308 2000

FAULT TOLERANT VCR RECORDING CONTROL

This is a continuation of application Ser. No. 08/261,083, filed Jun. 16, 1994, now abandoned, which is a continuation of application Ser. No. 07/778,319, filed Oct. 21, 1991, now abandoned.

FIELD OF THE INVENTION

This invention concerns videocassette recorders (VCR's) equipped with VPT (VCR Programmed by Teletext).

BACKGROUND OF THE INVENTION

It is well known that very often problems occur when a user attempts to program his VCR to record a television show at a given time and date. To eliminate these problems VPS (Video Program System) and VPT (VCR Programmed by Teletext) were introduced. These systems are in common use in Europe. VPT was formerly known as VPV (Videotext Programmed VCR).

The original purpose of adding a supplementary VPS signal to the image-representative TV broadcast signal was to simplify the use of home videocassette recorders (VCR's). Prior to the introduction of VPS, these VCR's were programmed by means of a timer, which started and stopped the VCR according to the time when the desired television program of interest was scheduled for transmission.

Occasionally, the program of interest could not be correctly recorded, for example, due to a delay in the completion of the previous television program. The VPS signal was intended to overcome this drawback by providing an accurate indication of the starting time of a new program. A more detailed description is available in the literature, (see for example, "VPS-Ein neues System Zur beitragsgesteuerten Programmaufzeichnung", Rundfunktech-nische Mitteilungen, Heft 4,1985).

The VPS program identification code occupies four bytes (11–14) on data line 16 in the vertical blanking (retrace) interval of a TV broadcast signal. The four bytes of the VPS signal contain information such as day and time of day of the originally scheduled start of a particular TV program to be broadcast. A more detailed description of the VPS signal is provided below.

To make the programming of VCR's even more convenient, the VPT system was developed (see "Videotext programmierte Videoheimgerate (VPV)" Rundfunktech-nische Mitteilungen, Heft 3, 1986).

VPT involves the automatic transfer of the necessary information to a VCR from the program pages of the teletext service. The user causes the display of a directory of teletext program pages, and moves a cursor to the desires television program title. Upon pressing an appropriate button on a remote control, the necessary VPS program identification information is transferred to the VCR.

It should be mentioned that the scheduled time and the VPS-time are not always identical. This is because the scheduled time is updated whenever a particular program runs overtime and subsequent programs are delayed or a schedule is otherwise changed. The VPS time always remains unchanged since it is assigned to the program and not to the actual final broadcast time.

By use of VPS and VPT, incorrect recording of a desired television program, caused either by time-shifted television programs or by errors made by manual keying in of the data such as start time stop time, date, and program source (channel), is thus greatly eliminated.

Unfortunately, even if the VPS and VPT systems are used, the recording of the desired television program can still fail because of VPT or VPS errors originating from the studio side. Television programs are announced on VPT program schedule pages two weeks in advance. If such a page contains incorrect VPS data and a VCR is programmed with the incorrect data, the recording of that particular television program will, of course, fail. Usually, such errors are noticed and corrected by the editors of these pages sometime after the incorrect data is entered. Even though such errors are later corrected on the VPT pages by the editor, a conventional VCR cannot adapt its preprogrammed data to such corrections. Another source of errors which may prevent the recording of desired television programs is the entry of incorrect VPS codes onto data line 16, also caused by mistakes made at the broadcaster side.

SUMMARY OF THE INVENTION

It is herein recognized that conventional VPT programming and recording control can be complemented with an error detection and correction procedure to provide immunity against the above mentioned errors.

Conventional VPT/VPS recorders merely compare the incoming VPS data with preprogrammed data sets. The recording starts as soon as a matching pair of data is found and stops at the moment the data differ.

It is further herein recognized that preprogrammed data sets should be compared continuously with the data on the latest actual teletext TV program schedule pages. If differences between the two are detected, the preprogrammed data are automatically adapted to the newer data. In this manner, an error which was on a program page at the moment of programming the VCR (and therefore transferred to the programming data memory) is automatically detected and corrected.

It is also herein recognized that the incoming VPS codes should also be continuously compared with the data on the corresponding teletext pages containing the day's TV program schedule. The controller reacts in a suitable manner in case of discrepancies of the data. Incorrect VPS codes transmitted along with the program are thus also detected and corrected.

With these two additional procedures a fault tolerant recording control is established and a correct recording of the desired programs guaranteed.

BRIEF DESCRIPTION OF THE DRAWING

FIG. 2 shows a display of a VPT teletext page, which contains VPT information as is known from the prior art.

FIG. 3 shows a display generated by a VCR according to the subject invention.

FIG. 4a shows an example illustrating a problem occurring in a prior art conventional VCR.

FIG. 5 shows further examples of display screens illustrating operation useful for understanding the subject invention.

DETAILED DESCRIPTION OF THE DRAWING

Figure 1:
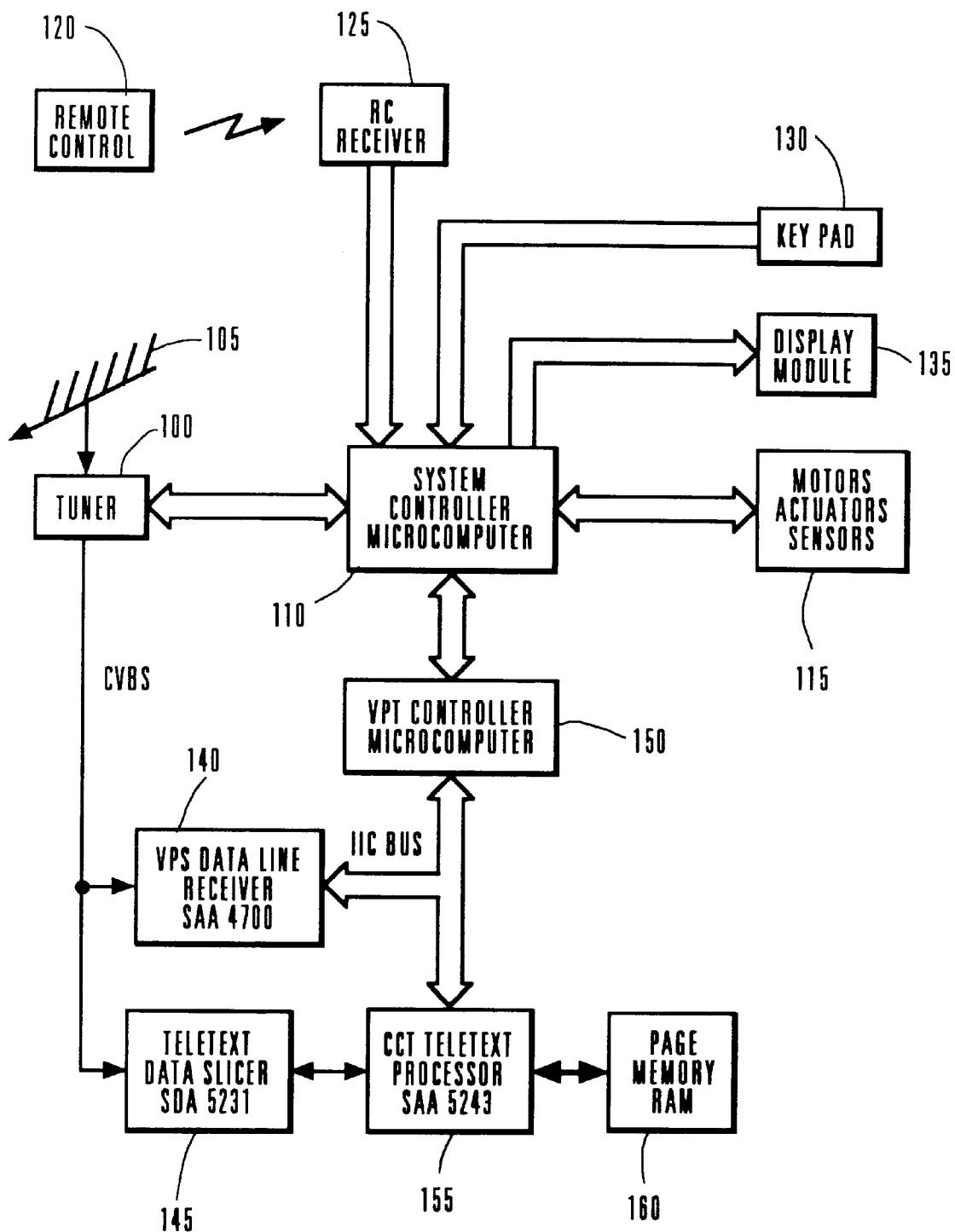
FIG. 1 shows a simplified block diagram of a VCR with VPT suitable for use with the invention.

Referring to FIG. 1, a VCR includes a tuner 100 for selecting a particular television signal from a plurality of television signals received by an antenna 105. Tuner 100 operates under control of a system controller microcomputer 110. System controller microcomputer 110 also controls the various motors, actuators, and sensors 115 of the mechanical portion of the VCR (not shown). System controller microcomputer 110 receives data entered by a user from one of two sources, either from remote control unit 120 via remote control (RC) receiver 125, or from a locally-mounted key pad 130. System controller microcomputer 110 also generates signals for controlling a display module 135. The components described thus far are standard television signal processing elements of commonly available VCR's.

In addition to the television signal processing elements described above, the VCR of FIG. 1 also includes teletext processing elements 140–160. Tuner 100 supplies a composite video and blanking signal (CVBS) to a VPS Data Line Receiver unit 140 (such as a Siemens SAA 4700) and to a Teletext Data Slicer unit 145 (such as a Seimens SDA 5231). It is also possible to omit separate VPS data line receiver 140 if a teletext data slicer with built-in VPS decoder is used (such as a Seimens SDA 5645).

Teletext Data Slicer unit 145 separates the serial teletext data stream from the composite video signal and routes the teletext signals to a CCT Teletext Processor unit 155 (such as a Siemens SAA 5243) (CCT=Computer Controlled Teletext decoder). CCT Teletext Processor 155 stores decoded teletext data in a page memory unit 160. VPS Data Line Receiver unit 140 extracts VPS codes from the accompanying image-representative composite video signal.

A VPT controller microcomputer 150 oversees all teletext functions, controls the user-programming of the VCR, provides communication with the user and also controls the recording of preprogrammed items. Alternatively, separate VPT controller microcomputer 150 may be omitted if VCR host system controller 110 is powerful enough to handle the additional functions. Communication between CCT Teletext Processor unit 155, VPS Data Line Receiver unit 140, and VPT controller microcomputer 150 is handled over an IIC bus (sometimes called an I$^2$C bus). For more information on the I$^2$C bus reference should be made to the Philips Technical Publication of 1986 entitled "I$^2$C Bus Specification".

FIG. 2 shows a VPT teletext page, which contains in addition to start and stop time and the title, the so-called VPT information reflecting the VPS code of each program and consists of the program source code, the VPS-date and the VPS-time. After acquiring such a page, the item to be preprogrammed for recording is selected by means of a cursor. VPT controller 150 then transfers all recording data (the complete VPS label, start and stop time and the first row of the title) into the program memory, which can be a part of teletext page memory 160. It is displayed to the user on request, as shown in FIG. 3.

In conventional implementations, the recording controller continuously reads all incoming VPS codes out of the VPS decoder and compares them with the preprogrammed data. Recording is started when a matching pair is found and is stopped at the moment the data differs again. For such VPS recordings, a single error is fatal because VPS uses bit-pattern comparisons and any mismatch disables the desired recording.

The procedures that provide the fault tolerance always require the most current version of the actual TV program schedule pages. Each day, when the first program is transmitted, its VPS code is used to find the pages that contain the day's TV program schedule by means of the search algorithm described in EPO patent application no. 90107169.6 (published as EP 0 393 555). This procedure is followed for each channel. Once these pages have been found, they can always be acquired again for the rest of the day by using the page numbers determined at first reception.

As noted above, one aspect of the invention is to detect programming errors that result from incorrect VPS data on the VPT page at the moment of programming. This is accomplished by continuously comparing preprogrammed data with the data in the TV program schedule pages and by adapting any update. To this end, controller 150 continuously searches for the preprogrammed VPS codes within the TV program schedule pages.

If no matching VPS code is found for such a preprogrammed item, then the editor must have corrected the VPS code of the corresponding program in the meantime. Because, in addition to the usual programming data, the title of the desired program was also stored, controller 150 is able to find the corresponding program on the VPT pages by using the relevant title as a search argument. As soon as a program with a matching title is found, controller 150 replaces the preprogrammed data with the corrected VPS code from the VPT page. In this manner, all programming data are updated to the latest schedule.

Figure 4A:
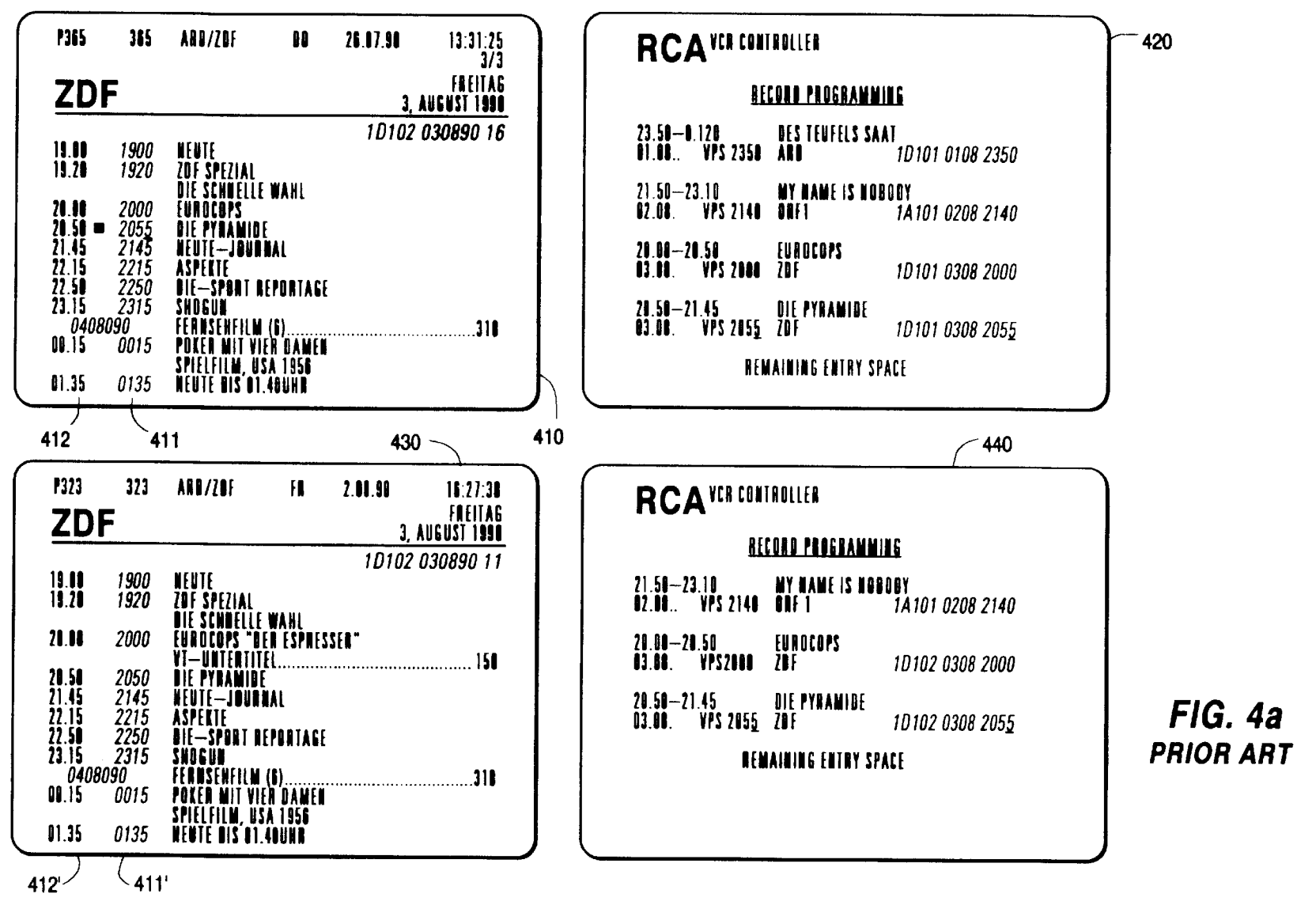
Figure 4B:
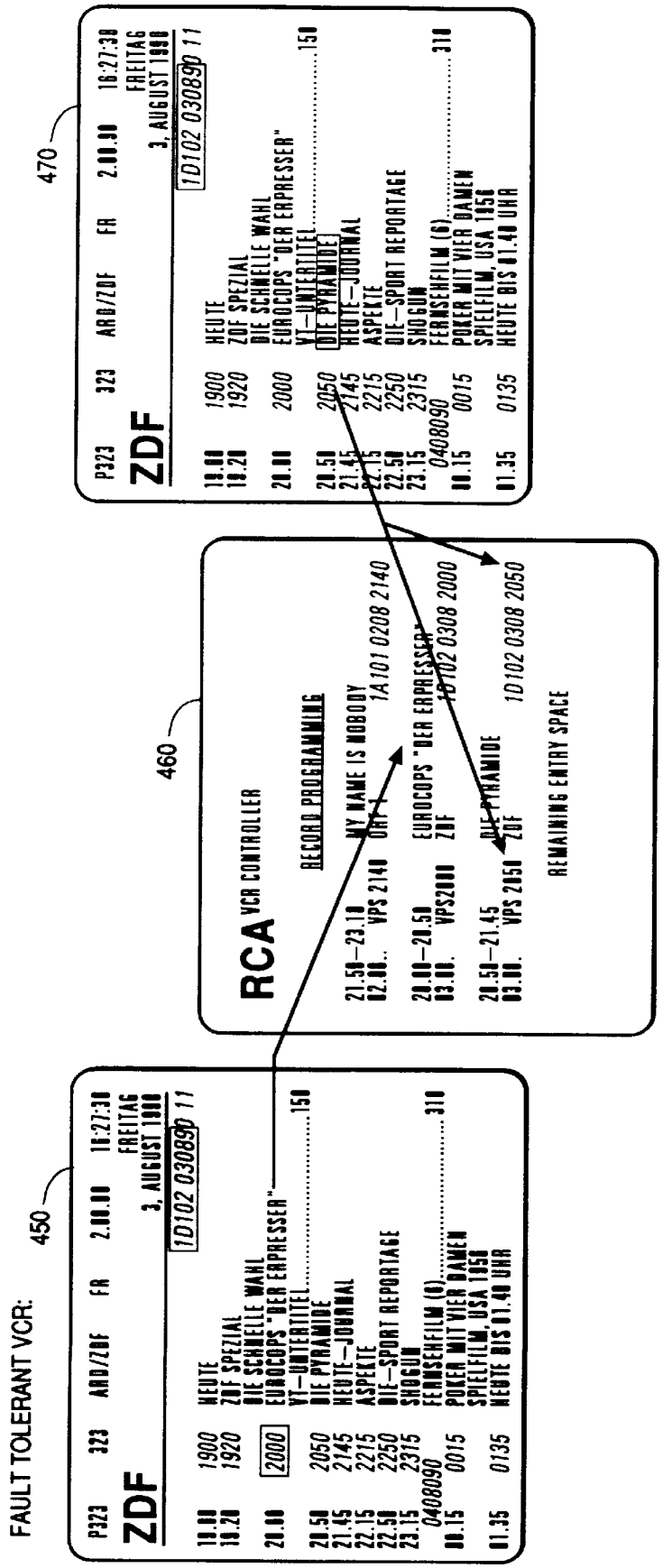
FIG. 4b shows screens illustrating operation according to the subject invention.

FIG. 4*a* shows an example of the operation of a conventional VCR with VPS and VPT capability. FIG. 4*b* shows operation of the supplementary procedure of the fault tolerant VCR, as described above.

Referring to FIG. 4*a*, on Jul. 26, 1990, a VPT page 410 is transmitted showing the television schedule for a particular broadcaster (ZDF) for Aug. 3, 1990 (i.e., one week ahead). A user moves a cursor to the entry for the television program "Die Pyramide". By pressing the appropriate key of remote control unit 120, the user instructs the VCR to program itself with the data necessary to record the television show "Die Pyramide" as shown in a screen display 420. Unfortunately, in this example, the editor of that particular page inadvertently typed an incorrect VPS-time code (i.e., 2055 instead of 2050). As a result, the VCR is now programmed with incorrect data. Note that there are two columns of times shown in screen display 410. Time column 411 contains the VPS-codes which correspond to the originally scheduled start times of the various television programs which are assigned when the schedule is written, i.e., the VPS-codes. Time column 412 contains the actual starting times of the television programs. The VPS time codes are never changed and serve to identify each program. The actual starting times may be changed if, for example, the previously scheduled program was a sporting event which ran over time. Thus, it is perfectly acceptable for the VPS time and the actual start time to differ from each other.

Screen display 430 shows a VPS schedule page transmitted on Aug. 2, 1990, showing the television schedule for the same broadcaster (ZDF) for Aug. 3, 1990 (i.e., now only one day ahead). Note that the editor of the schedule page has noticed his error, and has changed the VPS time to the correct VPS time of 2050. Remember that the VCR has already been programmed to search on Aug. 3, 1990 for the television program identified by the VPS time code of 2055, and to begin recording when such program is found. On Aug. 3, 1990, the broadcaster will transmit the television program "Die Pyramide" with the correct VPS time code identifier of 2050 (because the mistake has been corrected). Unfortunately, there will be no correspondence between the transmitted VPS time code of 2050 and the preprogrammed time code in the VCR (because the program memory in the VCR still contains the erroneous VPS time code data), so as a result, nothing will be recorded.

The operation of a fault-tolerant VCR according to the subject invention will now be explained with reference to FIG. 4b. VPS screen displays 450 and 470 show the same VPS schedule page transmitted on Aug. 2, 1990, but each is highlighted to draw attention to different data entries. In the fault-tolerant VCR according to the subject invention, controller 150 continuously searches the received teletext pages for entries corresponding to preprogrammed VPS codes. VCR programming screen 460 illustrates that three television shows have been programmed for recording. In this example changes have been made to two of the three entries. VPS schedule page 450 shows that the title of the Eurocops episode "Der Erpresser" has been added. The VPS time code 2000, corresponding to that entry will be found during a search by controller 150, and the preprogrammed information for that show will be updated to reflect the corrected title, as shown in screen display 460. VPS schedule page 470 shows that the incorrect VPS time code 2055has been changed to the correct entry of 2050. A search of VPS time codes by controller 150 will no longer find an entry for 2055. In response to the failure to detect this preprogrammed time code, controller 150 searches the VPS schedule pages for Aug. 3, 1990 for that particular broadcaster for an entry containing the title "Die Pyramide". Upon finding the title, the new VPS time code is entered. Thus, on Aug. 3 1990 the correct VPS code will be transmitted when the television show begins, and the television show will be correctly recorded.

(For simplification, the search can be restricted to those preprogrammed items, that are scheduled to be transmitted on the present day. The controller thus only searches for a matching VPS code within those pages that contain that day's TV program schedule).

Another aspect of the invention is to detect wrong VPS codes transmitted within the signal. That is, the VPS code associated with the currently running television program. To detect such errors the controller checks if the incoming VPS code is contained on the actual TV program schedule pages and thus represents a scheduled program. This is always done when the VPS code changes, which usually signifies the end and/or beginning of the next program, but can also occur erroneously during a program. If an incoming VPS code is not found on the TV program schedule pages, there are two possible reasons:

1. A wrong VPS code is transmitted and therefore this VPS code cannot be found on the TV program schedule pages. In this case, the controller replaces the wrong VPS code by the VPS code according to the program schedule, assuming that the latter is the correct code. The recording is then controlled by this corrected VPS code.

2. The VPS code represents a program, inserted on short term (e.g., a newsworthy event), which is therefore not yet listed on the program schedule pages. The controller reacts in this case in the same manner as described above, as the controller cannot differentiate between these two cases. But this does not matter, as usually, sooner or later, such inserted programs are announced on the TV program schedule pages, especially if they have a longer duration. In this case the controller then finds the VPS code, which was assumed to be wrong, on an updated page and concludes that the schedule change was due to an inserted program. In case recording was initiated before by a "corrected" VPS code, the controller will rewind the tape to the corresponding position. Alternatively, recording with a different (corrected) VPS code can be maintained at least as long as the remaining tape is sufficient to record the remaining preprogrammed items.

Figure 5:
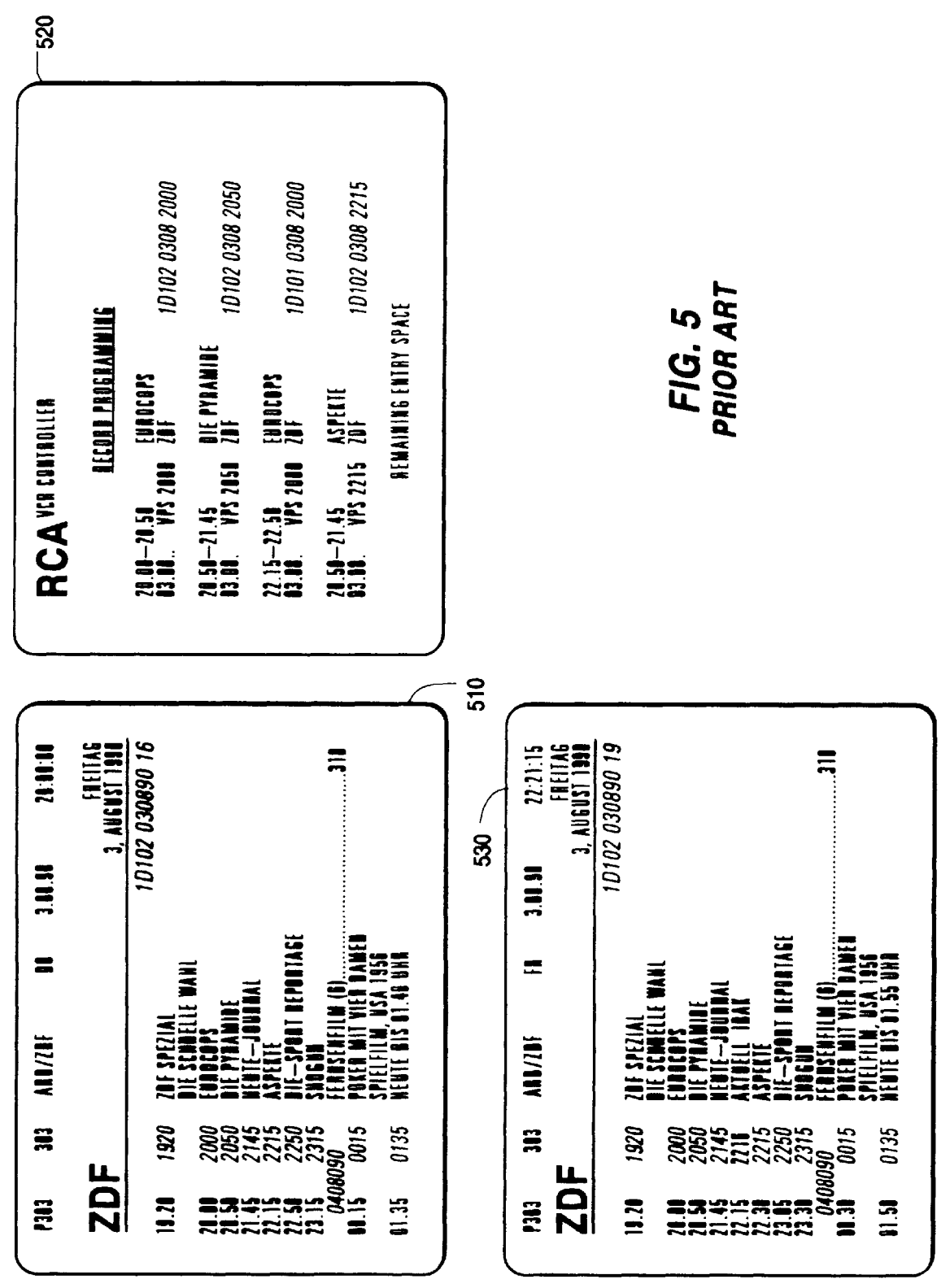

FIG. 5 shows an example of the above-given operation. Teletext page 510 is transmitted at 20:00, containing a schedule for that day's programming. VCR programming page 520 shows that three of these television shows have been preprogrammed for recording. No schedule changes are indicated on screen display 510. At 20:00 the VPS time code (1D102 0308 2000) for the television program "Eurocops" is detected and that show is recorded. At 20:50 a television show bearing an erroneous time code (1D102 0308 2051) is transmitted. In a conventional VCR, nothing would be recorded because the VPS time code does not match the preprogrammed time code for the show "Die Pyramide" (1D102 0308 2050). However, in apparatus according to the subject invention, if controller 150 does not find the VPS code of the currently broadcast television program in the current VPT page, controller 150 concludes that the received code is incorrect, and replaces it with the VPS code according to the schedule. In this example, the received code (1D102 0308 2051) will be replaced by the code from the schedule (1D102 0308 2050) and the recording of the show will be initiated. At 21:45 nothing will be recorded because the television show "heute-journal" was not selected for recording by the viewer (as shown in VCR programming screen 520).

At 22:15 a television show entitled "Aktuell IRAK", and assigned a VPS time code of 2216 is transmitted. As can be seen from schedule display screen 510, this television show was not scheduled, but nevertheless has been inserted. Note that VPS time code 2215 could not be assigned to "Aktuell IRAK" because that VPS code is already assigned to the television show entitled "Aspekte". At 22:15 controller 150 detects the received time code (1D102 0308 2216). As explained above, controller 150 will not find the VPS code of the currently broadcast television program ("Aktuell IRAK") in the current VPT page, and will conclude that the received code is incorrect, and will replace it with the VPS code according to the schedule. In this example, the received code (1D102 0308 2016) will be replaced by the code from the schedule (1D102 0308 2015) and the recording of the show will be initiated. At 22:21, a new VPS schedule page 530 is transmitted, containing the corrected schedule showing the insertion of the television program "Aktuell IRAK" at 22:15, bearing the VPS identification code 1D102 0308 2016, and the delaying of the following programs. In response, controller 150 finds the code of the currently running program in the updated VPT page, and concludes that it is an inserted television program. The recording is then stopped and controller 110 rewinds the tape. At 22:30 the television show "Aspekte" begins, its VPS code is detected, and the show is properly recorded, even though it began after a 15 minute delay from its originally scheduled time.

It is important to note that, as a result of the above-described procedures, a correct recording is made even though the editor has not corrected incorrect VPS data on the TV program schedule pages. This results from the fact that controller 150 corrects an incoming VPS code according to the schedule if it is not found on the TV program schedule pages. This happens if a correct VPS code is transmitted, but the VPT page contains an incorrect VPS code. In this case, the VPS code is corrected to the wrong code from the page, but as the preprogrammed code coincides with the incorrect code, a correct recording is made, as shown in FIG. 6.

Figure 6:
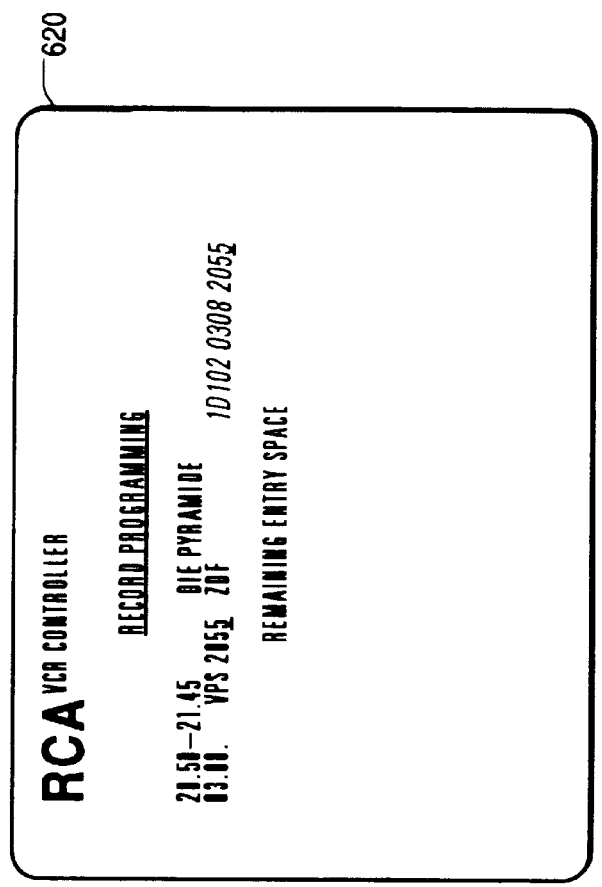
FIG. 6 shows screens illustrating operation according to the subject invention.

In FIG. 6, a teletext VPS schedule page 610 containing an incorrect VPS time code (2055 rather than 2050) is used to program a VCR. VCR programming page 620 shows that the incorrect VPS time code 2055 has been stored in memory. In this case, assume that the editor of the schedule page does not notice and correct his mistake. At 20:50 the television show "Die Pyramide" begins and its correct VPS identification code 1D102 0308 2050 is detected. In a conventional VCR with VPS and VPT capability nothing would be recorded, because there is no correspondence between the VPS time code stored in the VCR (1D102 0308 2055) and the transmitted VPS time code (on television line 16) for the currently running program (1D102 0308 2050). In contrast, in apparatus according to the subject invention, controller 150 will not find the VPS code for the currently running television program in the current VPS schedule page. Controller 150 will therefore conclude that the VPS code for the currently running program is incorrect, and will replace it with the VPS code according to the schedule. The television show corresponding to the VPS time code of the current time slot (i.e., 20:50 on Aug. 3, 1990) was preprogrammed for recording. Therefore, recording is initiated. Thus, even though the programming error on the VPS schedule pages was not corrected, a VCR employing the subject invention will nevertheless record the desired television show properly.

Figure 7:
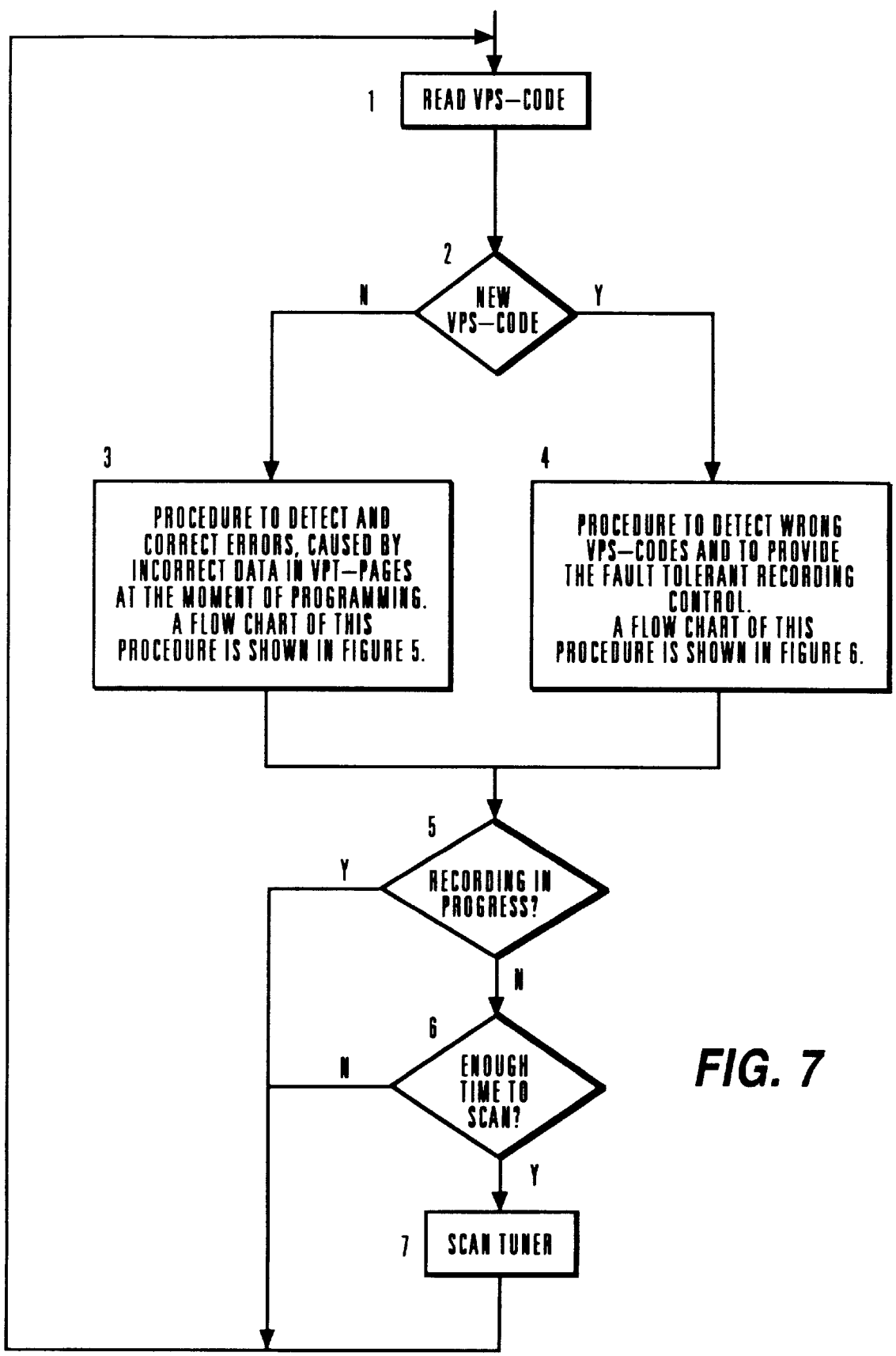
FIGS. 7–9 are flowcharts of program instructions suitable for execution by microcomputer 150 of FIG. 1.

FIG. 7 shows a simplified flow chart of the recording control software for controller 150, which is suitable for use with the invention. It is just an example for such an implementation, as the structure of the flow control depends strongly on the other parts of the resident VCR controller software.

Block 1: Read VPS code out of the VPS data line receiver.
Block 2: Check if the VPS code changed since the last read operation.
Block 3: The flow chart of this block is shown in FIG. 5.
Block 4: The flow chart of this block is shown in FIG. 6.
Block 5: Check if recording is in progress.
Block 6: Check if there is enough time to scan the tuner to another pre-programmed station, or if a recording is expected soon on the present station.
Block 7: Scan tuner to the next preprogrammed station.

Figure 8:
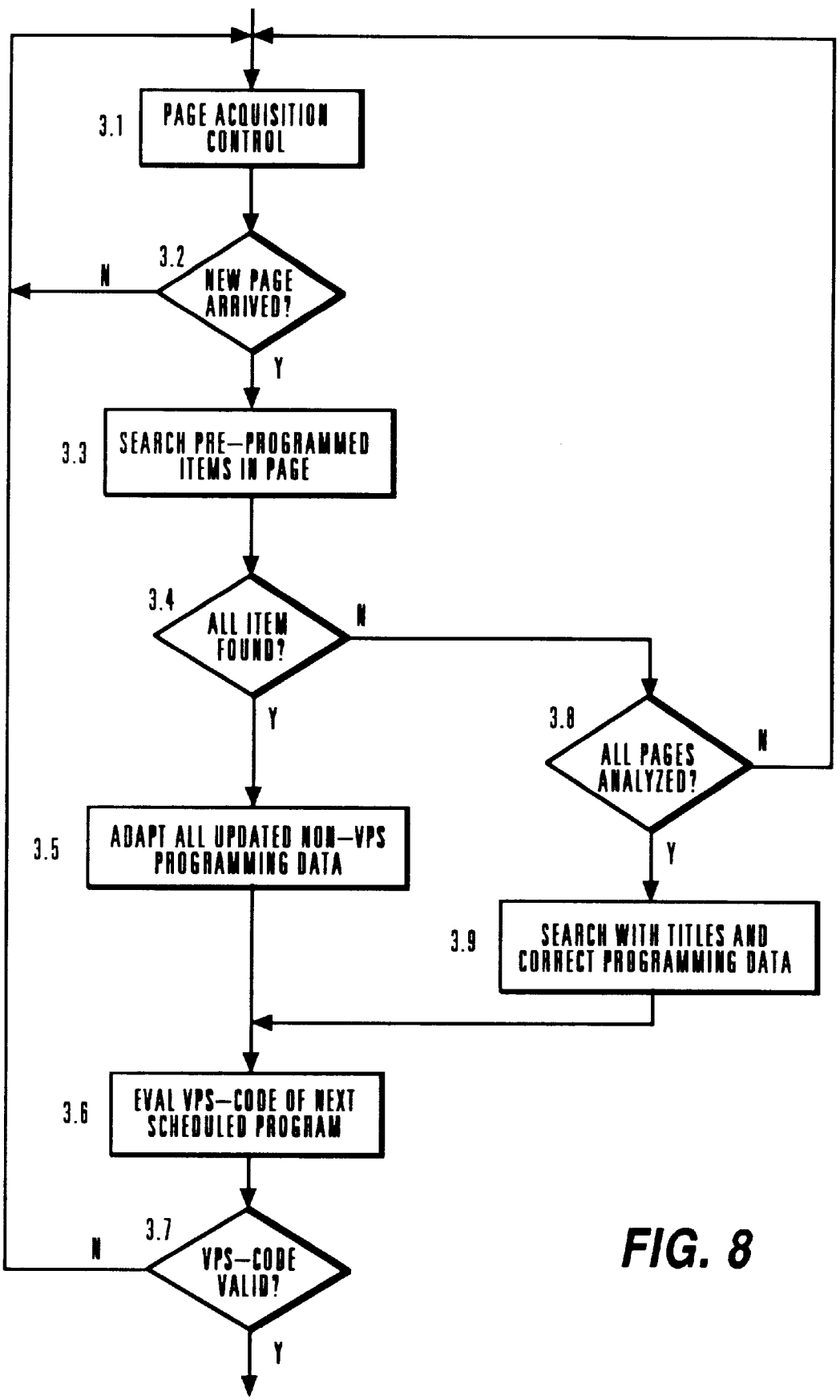

FIG. 8 shows a flow chart of the procedure that detects and corrects errors caused by incorrect data in the VPT-pages at the moment of programming.

Block 3.1: The teletext acquisition circuits and the related chapters of the page memory have to be controlled such that all pages, containing parts of the day's TV program schedule, are captured. The required information (page numbers a.s.o.) is obtained from Block 4.2.
Block 3.1: Check if a new TV program schedule page has arrived.
Block 3.3: Check if VPS codes of preprogrammed items are contained in that page.
Block 3.4: Check if the VPS codes of all preprogrammed items were found within those pages, captured and analyzed until now.
Block 3.5: In case any non-VPS programming data (start time, stop time or title)changed on the TV program schedule pages, these updates are adapted.
Block 3.6: Evaluate the VPS code of the next scheduled program, using the captured pages. This "next" VPS code is required by Block 4.3.
Block 3.7: Check if the "next" VPS code, evaluated in Block 3.6, is valid. It is only valid if this code was found on the same page that contains the current program, or if tile start time of this "next" program corresponds to the stop time of the current program or if all pages were captured at the moment of evaluation.
Block 3.8: Check if all pages containing parts of the day's TV program schedule have been captured and analyzed.
Block 3.9: Get the updated programming data of those preprogrammed items not previously found when using their VPS code for search. These programming data are now found by searching the corresponding programs in the TV program schedule pages using the titles of the preprogrammed items.

Figure 9:
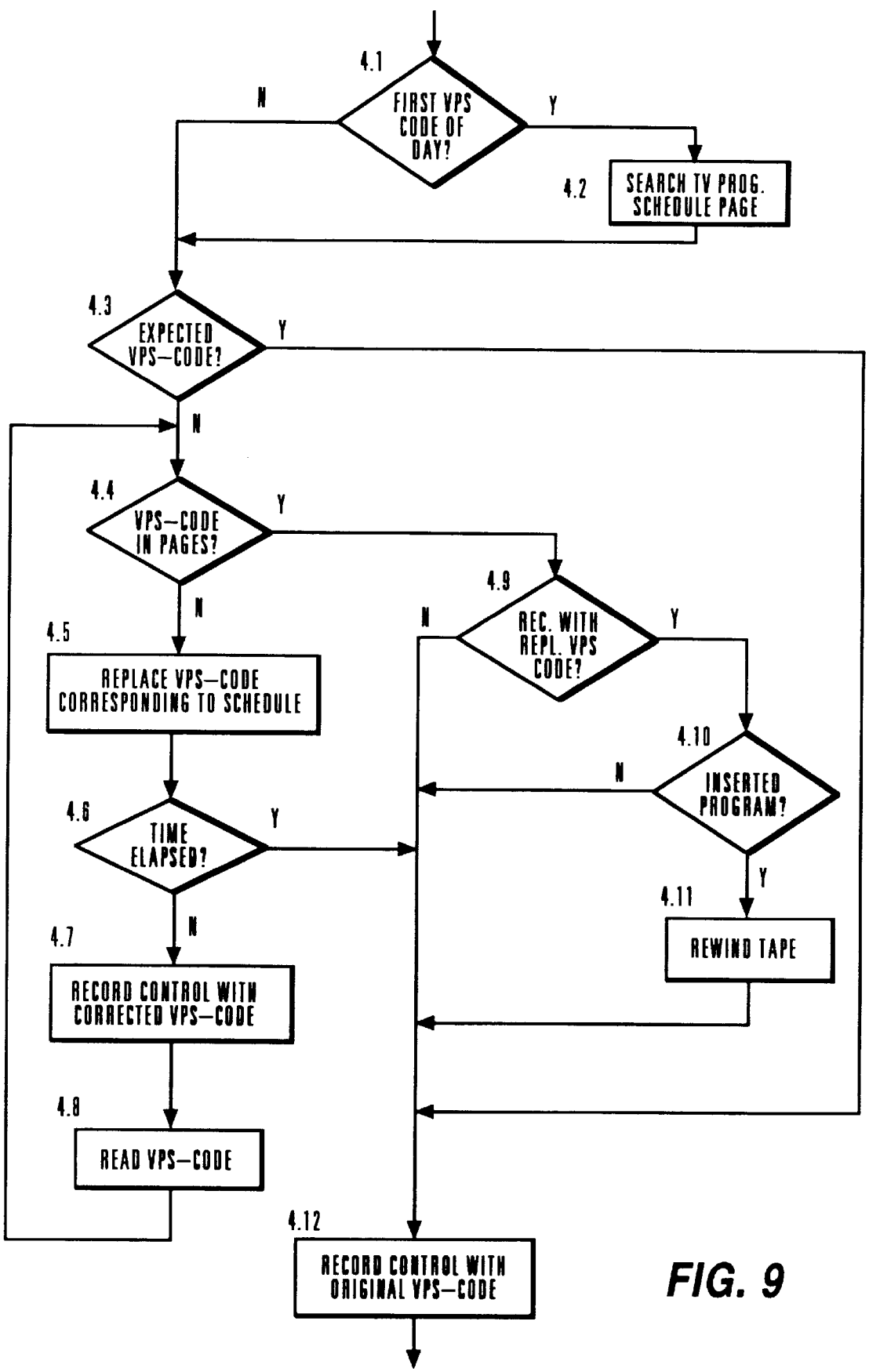

FIG. 9 shows a flow chart of the procedure that detects wrong VPS codes transmitted along with the program and provides the recording control.

Block 4.1: Check if it is the first VPS code received that day on that station.
Block 4.2: Search the TV program schedule page that contains the current program. Check also on which pages the rest of the day's schedule is distributed, if rolling pages are used and capture the page numbers of these pages. All this information is required by Block 3.1. During this search operation the controller must periodically read the VPS code from the VPS data line receiver and check if the corresponding program has to be recorded.
Block 4.3: Check if that new VPS code corresponds to the expected "next" VPS code obtained from Block 3.6.
Block 4.4: The controller checks if the VPS code is on the day's TV program schedule pages.
Block 4.5: The controller replaces the received "wrong" VPS code by the VPS code corresponding to the schedule.
Block 4.6: Check if the remaining tape is sufficient to record the remaining preprogrammed items.
Block 4.7: The corrected VPS code is compared with the preprogrammed codes. Recording is started or maintained if a matching pair is found. In case of no coincidence the recording is stopped if recording is in progress.
Block 4.8: Read VPS code out of the VPS data line receiver.
Block 4.9: Check if a record was made with a "corrected" VPS code.
Block 4.10: Check if the recorded program was an inserted program.
Block 4.11: Rewind the tape to the corresponding position.
Block 4.12: The original VPS code is compared with the preprogrammed codes. Recording is started or maintained if a matching pair is found. In case of no coincidence the recording is stopped if recording is in progress.

Figure 10:
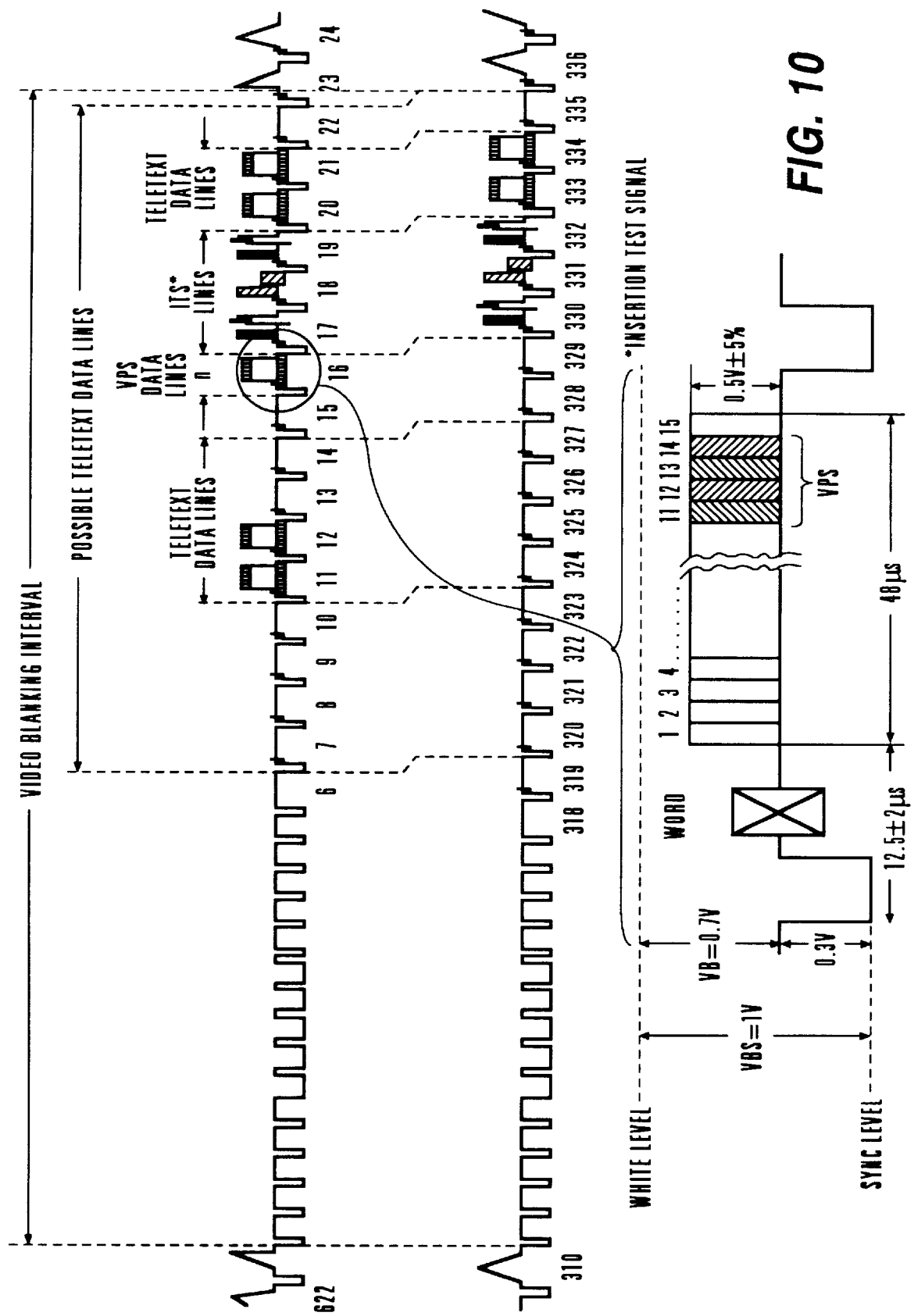
FIG. 10 shows a pictorial representation of two fields of video signals including teletext and VPS data.
Figure 11:
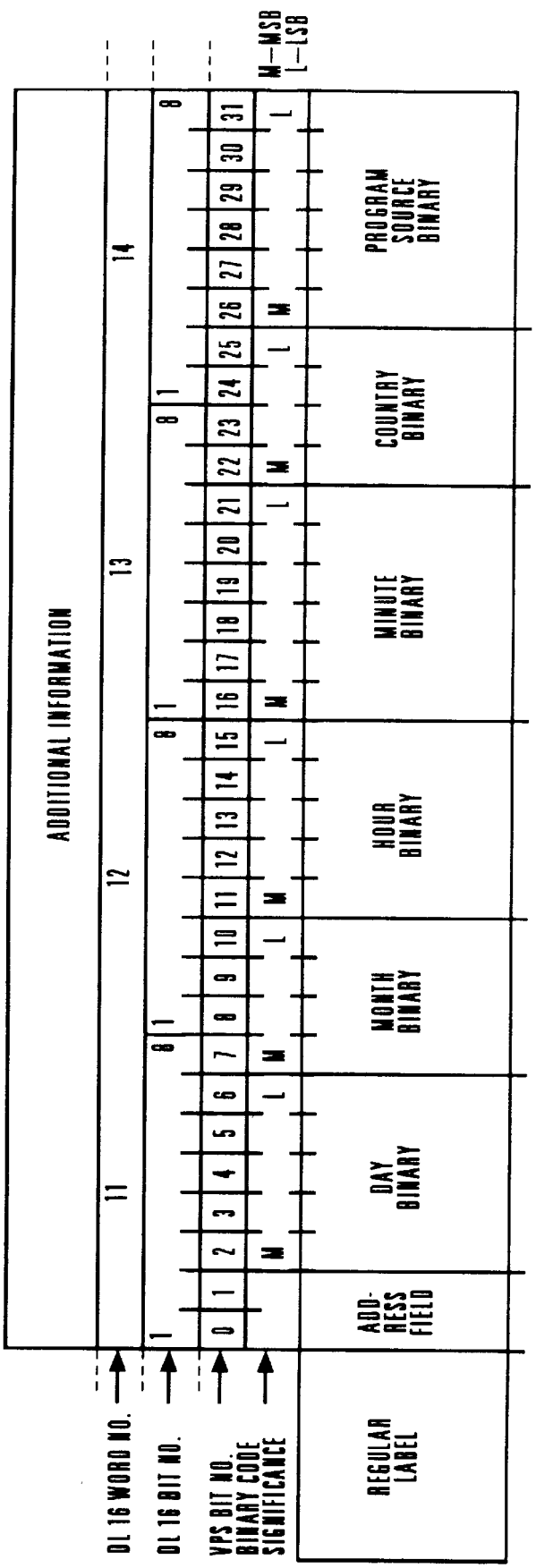
FIG. 11 shows a detailed view of a portion of television line 16.

FIGS. 10 and 11 may be useful in understanding the VPS system. FIG. 10 shows that the VPS signal for the currently running program is encoded on television line 16. FIG. 11 shows a detailed view of the VPS information content of television line 16.

It should be noted that the procedures of the subject application use those teletext pages containing the current program schedule, and the software must be able to find these pages within the teletext data system. As noted above, the search algorithm described in EPO patent application no. 90107169.6 (published as EP 0 393 555) is suitable for that purpose.

The term "television receiver" as used herein includes television receivers including a display means (commonly known as television sets", and television receivers without display means, such as VCR's.

What is claimed is:

1. A videocassette recorder, comprising:

means for selecting a particular television signal from a plurality of signals for recording, said particular television signal having an identifying signal encoded therein, said identifying signal being subject to content error;

control means coupled to said selecting means for causing said selecting means to select said particular television signal for recording;

means for receiving said identifying signal of said particular television signal when said particular television signal is transmitted;

means for receiving data related to a schedule of times and dates television programs to be transmitted at a future times, said data related to said schedule of times and dates television programs being subject to content error;

means for producing a signal which when displayed produces a display comprising a user readable schedule corresponding to said schedule data;

means for selecting individual ones of said television programs to be transmitted at a future time for recording;

storage means coupled to said control means for storing said schedule data and for storing data related to said selected individual ones of said television programs to be transmitted at a future time; wherein said control means in response to a reception of said identifying signal of said particular television signal when said particular television signal is transmitted searches said data related to a schedule of times and dates television programs to be transmitted at a future time for said identifying signal of said particular television signal, and upon failure to detect data related to said identifying signal of said particular television signal, automatically changes said identifying signal of said particular television signal to the identifying signal of a particular television program which said schedule indicates as the currently running television program.

2. The videocassette recorder of claim 1, wherein said schedule data includes time code data indicative of starting time on a particular date.

3. The videocassette recorder of claim 2, wherein said schedule data includes a television program identification code.

4. The videocassette recorder of claim 3 wherein said schedule data includes title information for individual television programs.

5. The videocassette recorder of claim 4, wherein said schedule data is provided by a teletext service.

6. A videocassette recorder, comprising:

means for selecting a particular television signal from a plurality of signals for recording, said particular television signal having an identifying signal encoded therein, said identifying signal being subject to being in error;

control means coupled to said selecting means for causing said selecting means to select said particular television signal for recording;

means for receiving said identifying signal of said particular television signal when said particular television signal is transmitted;

means for receiving data related to a schedule of times and dates of television programs to be transmitted at a future time, said schedule data being subject to being in error;

means for producing a signal which when displayed produces a display comprising a user readable schedule corresponding to said schedule data;

means for selecting individual ones of said television programs from said schedule for recording;

storage means coupled to said control means for storing said schedule data and for storing data related to said selected individual ones of said television programs; wherein said control means in response to a reception of said identifying signal of said particular television signal when said particular television signal is transmitted searches said schedule data for said identifying signal of said particular television signal, and upon failure to detect data related to said identifying signal of said particular television signal, automatically changes said identifying signal of said particular television signal to the identifying signal of a particular television program which said schedule indicates as the currently running television program and begins recording;

said control means in response to a subsequent detection of the addition of said undetected identifying signal of said particular television signal to said schedule data in said storage means ceases recording and rewinds the videotape to await the broadcast of the next scheduled selected television program.

* * * * *